(12) United States Patent
Mecuson et al.

(10) Patent No.: US 12,384,121 B2
(45) Date of Patent: Aug. 12, 2025

(54) METHOD FOR MANUFACTURING A PART MADE OF COMPOSITE MATERIAL WITH LIQUID COMPACTING

(71) Applicant: SAFRAN CERAMICS, Le Haillan (FR)

(72) Inventors: Gautier Mecuson, Moissy-Cramayel (FR); Paul Carminati, Moissy-Cramayel (FR); Matthieu Schwartz, Moissy-Cramayel (FR); Théophile Lardet, Moissy-Cramayel (FR); Bertrand Léon Marie Desjoyeaux, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/729,095

(22) PCT Filed: Jan. 12, 2023

(86) PCT No.: PCT/FR2023/050041
§ 371 (c)(1),
(2) Date: Jul. 15, 2024

(87) PCT Pub. No.: WO2023/135391
PCT Pub. Date: Jul. 20, 2023

(65) Prior Publication Data
US 2025/0108571 A1 Apr. 3, 2025

(30) Foreign Application Priority Data
Jan. 17, 2022 (FR) ........................................ 2200348

(51) Int. Cl.
*B29C 70/44* (2006.01)
*B29C 70/48* (2006.01)

(52) U.S. Cl.
CPC .............. *B29C 70/44* (2013.01); *B29C 70/48* (2013.01)

(58) Field of Classification Search
None
See application file for complete search history.

(56) References Cited

U.S. PATENT DOCUMENTS 6,537,483 B1 * 3/2003 Cartwright ............ B29C 35/041
264/516
2017/0334791 A1 11/2017 Podgorski et al.
(Continued)

FOREIGN PATENT DOCUMENTS

CN 101242947 A 8/2008
CN 101367267 A 2/2009
(Continued)

OTHER PUBLICATIONS

Written Opinion of the International Searching Authority as issued in International Patent Application No. PCT/FR2023/050041, dated Apr. 19, 2023.
(Continued)

*Primary Examiner* — Christopher T Schatz
(74) *Attorney, Agent, or Firm* — Pillsbury Winthrop Shaw Pittman LLP

(57) ABSTRACT

A method for manufacturing a part made of composite material, includes the arrangement of a fibrous preform in the impregnation chamber of a mold, the impregnation chamber being closed by a flexible membrane separating the impregnation chamber from a compaction chamber, an impregnation fluid being injected into the impregnation chamber and a compression fluid being injected into the compaction chamber, the compression fluid being a liquid in which the value of the density is between 60% and 125% of the density of the impregnation fluid.

11 Claims, 9 Drawing Sheets

(56) References Cited

U.S. PATENT DOCUMENTS

2018/0043637 A1* 2/2018 Jones .................... B32B 5/22
2021/0046671 A1 2/2021 Philippe et al.

FOREIGN PATENT DOCUMENTS

| CN | 105793020 A | 7/2016 |
| CN | 107278200 A | 10/2017 |
| CN | 111971263 A | 11/2020 |
| DE | 101 50 659 A1 | 5/2003 |
| FR | 2 162 296 A1 | 7/1973 |
| KR | 10-1395321 B1 | 5/2014 |
| WO | WO 00/46015 A1 | 8/2000 |
| WO | WO 2014/204672 A1 | 12/2014 |
| WO | WO 2019/166691 A1 | 9/2019 |

OTHER PUBLICATIONS

International Search Report as issued in International Patent Application No. PCT/FR2023/050041, dated Apr. 19, 2023.
First Office Action as issued in Chinese Patent Application No. 202380020615.8, dated Feb. 12, 2025.

* cited by examiner

[Fig. 1]
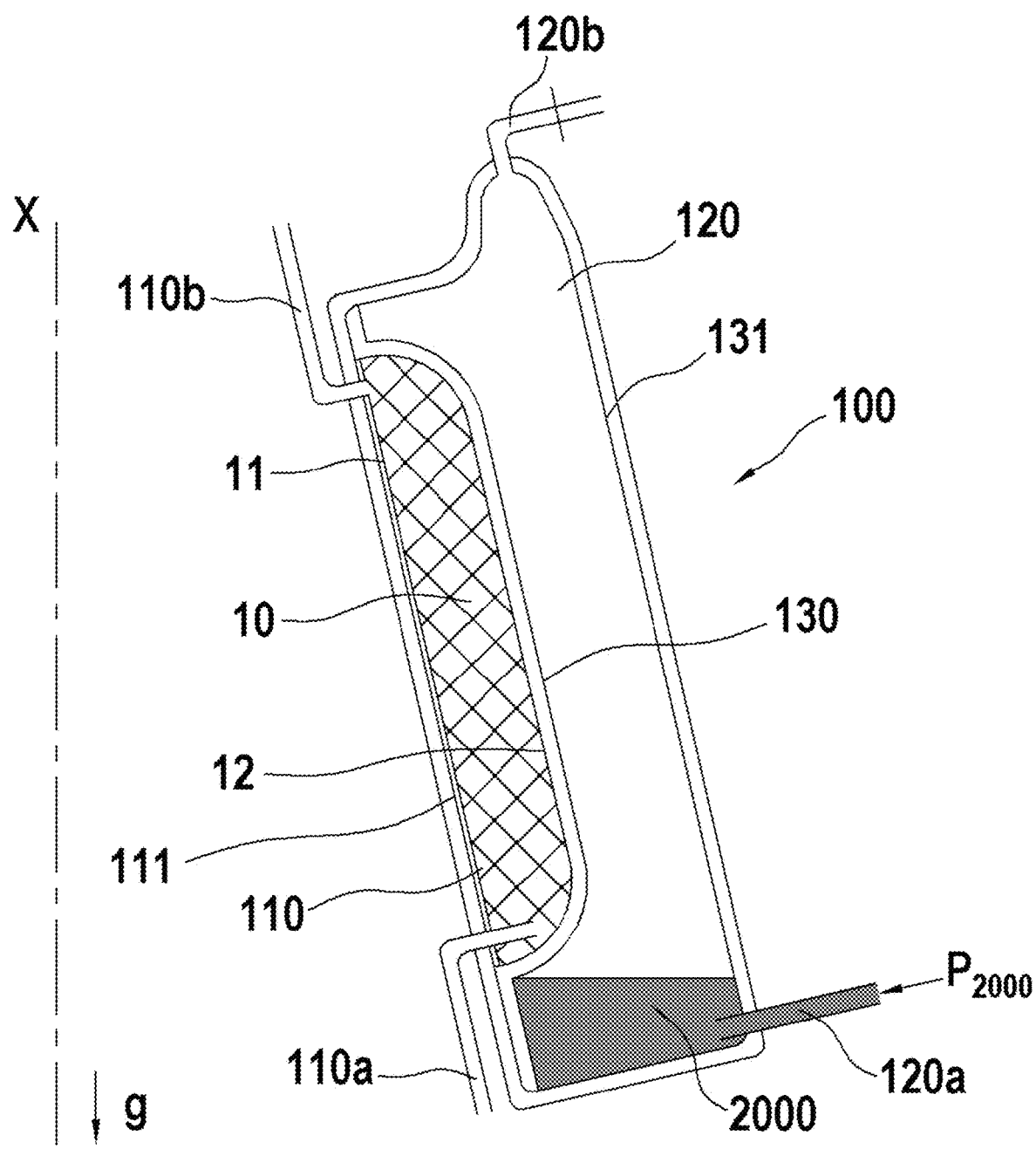

[Fig. 2]
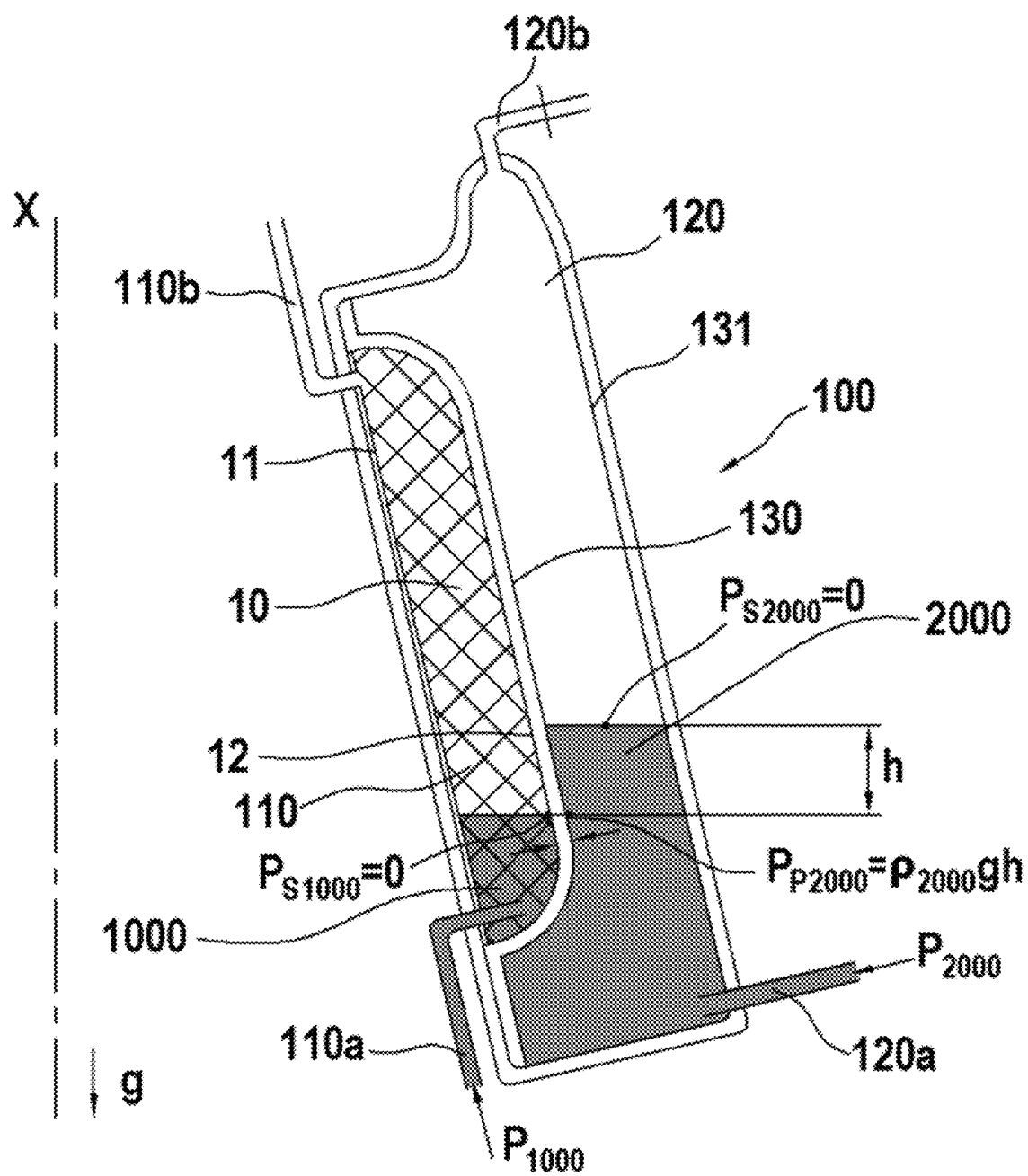

[Fig.3]
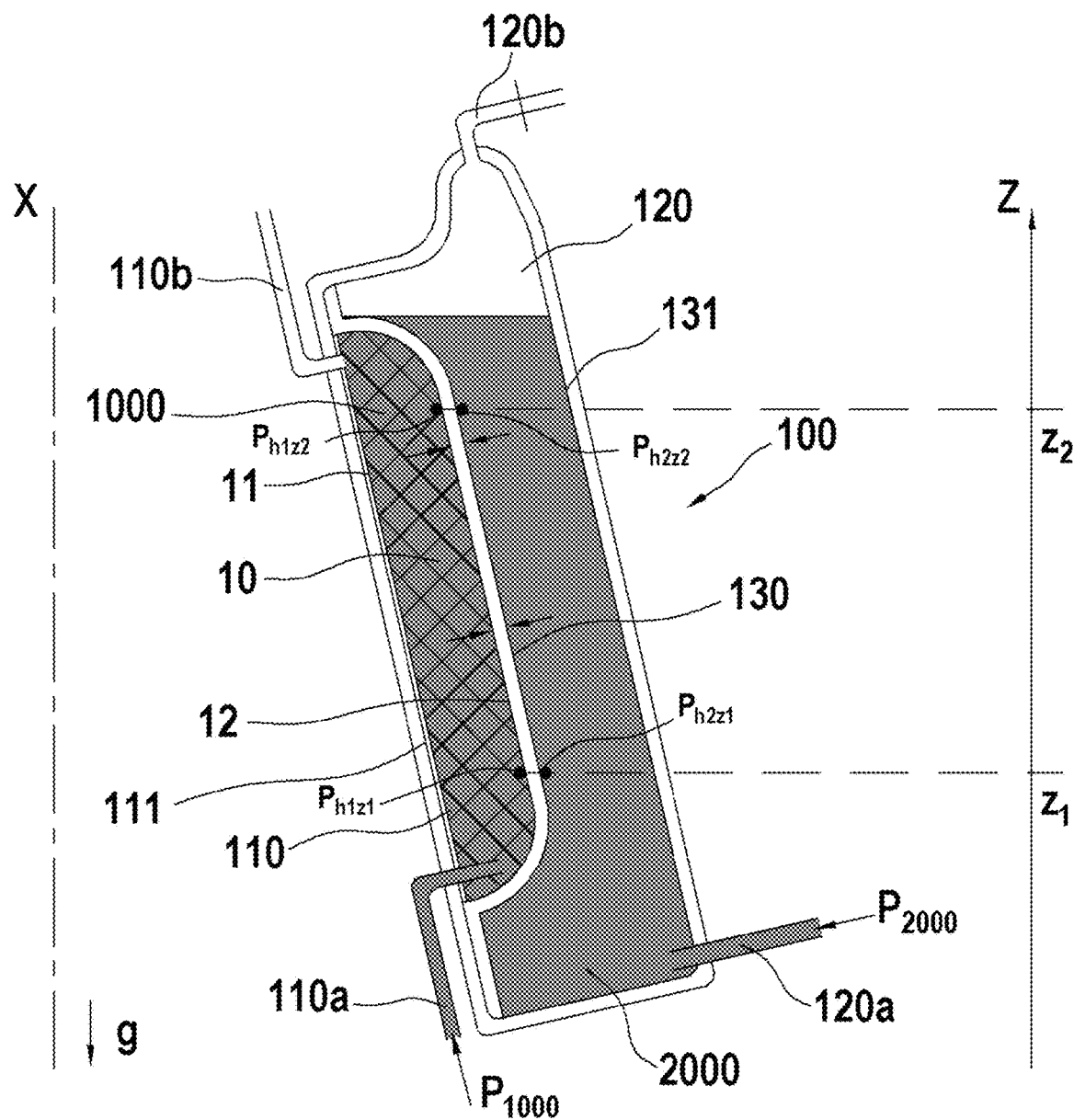

[Fig.4]
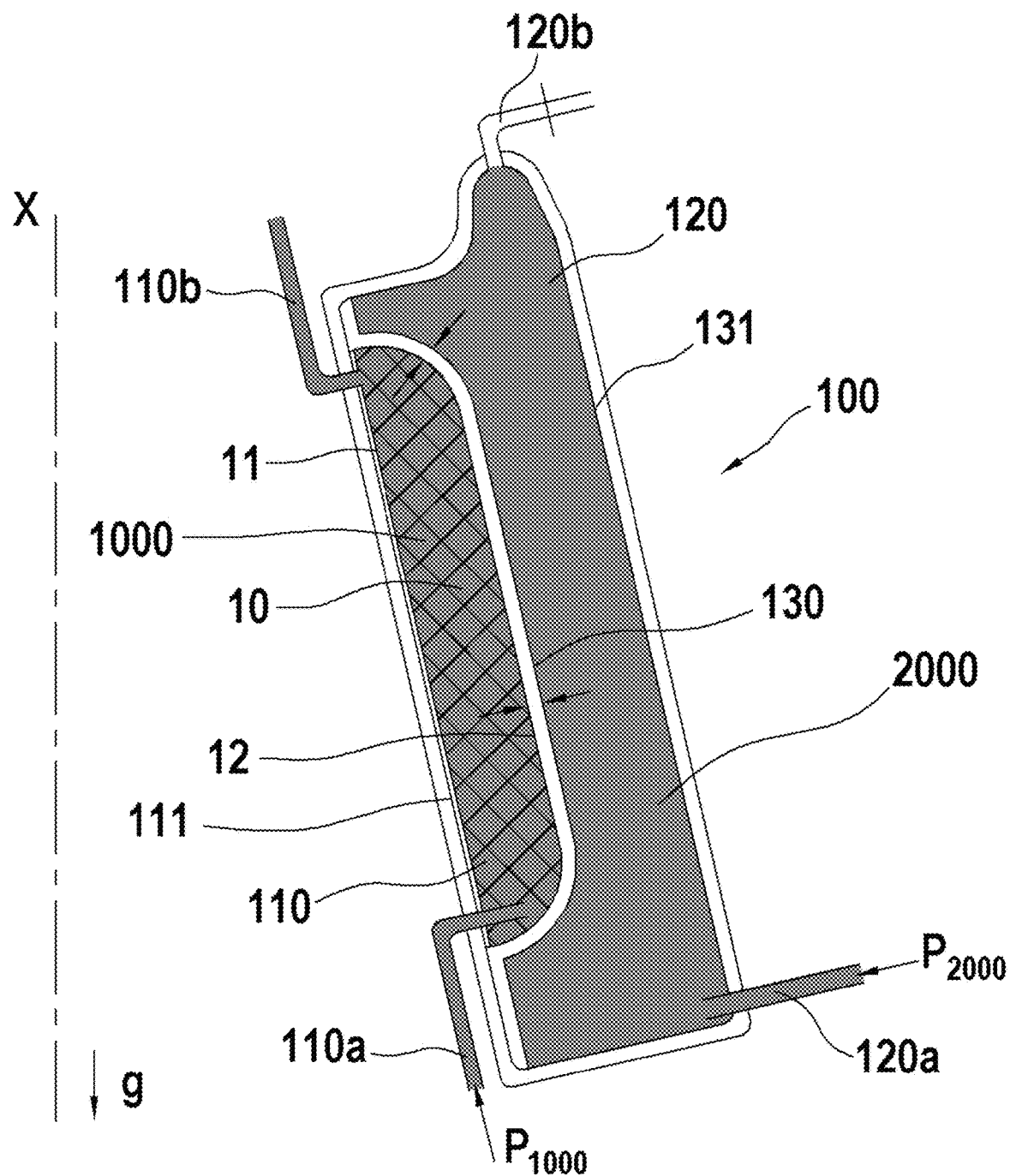

[Fig. 5]
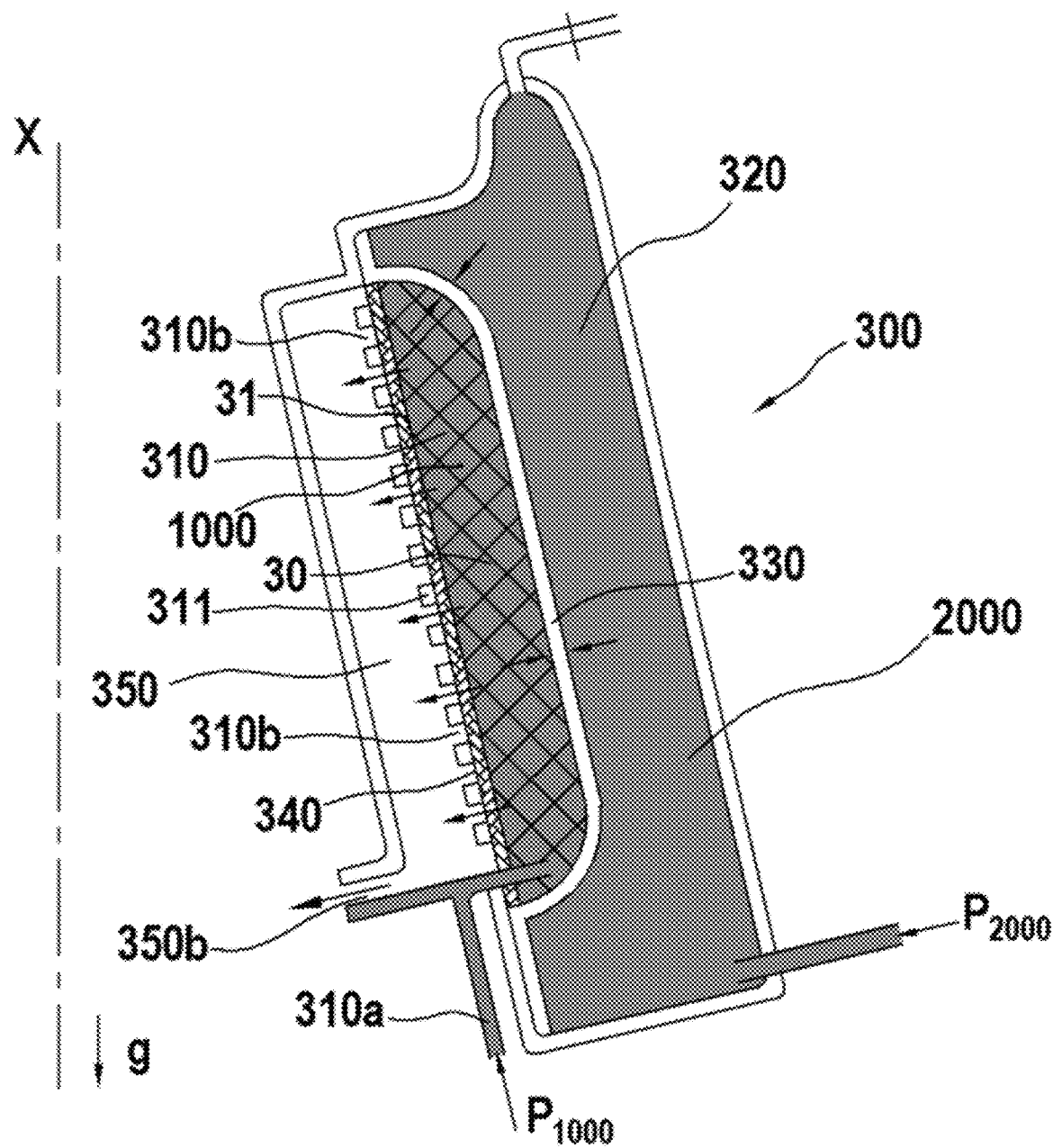

[Fig. 6]
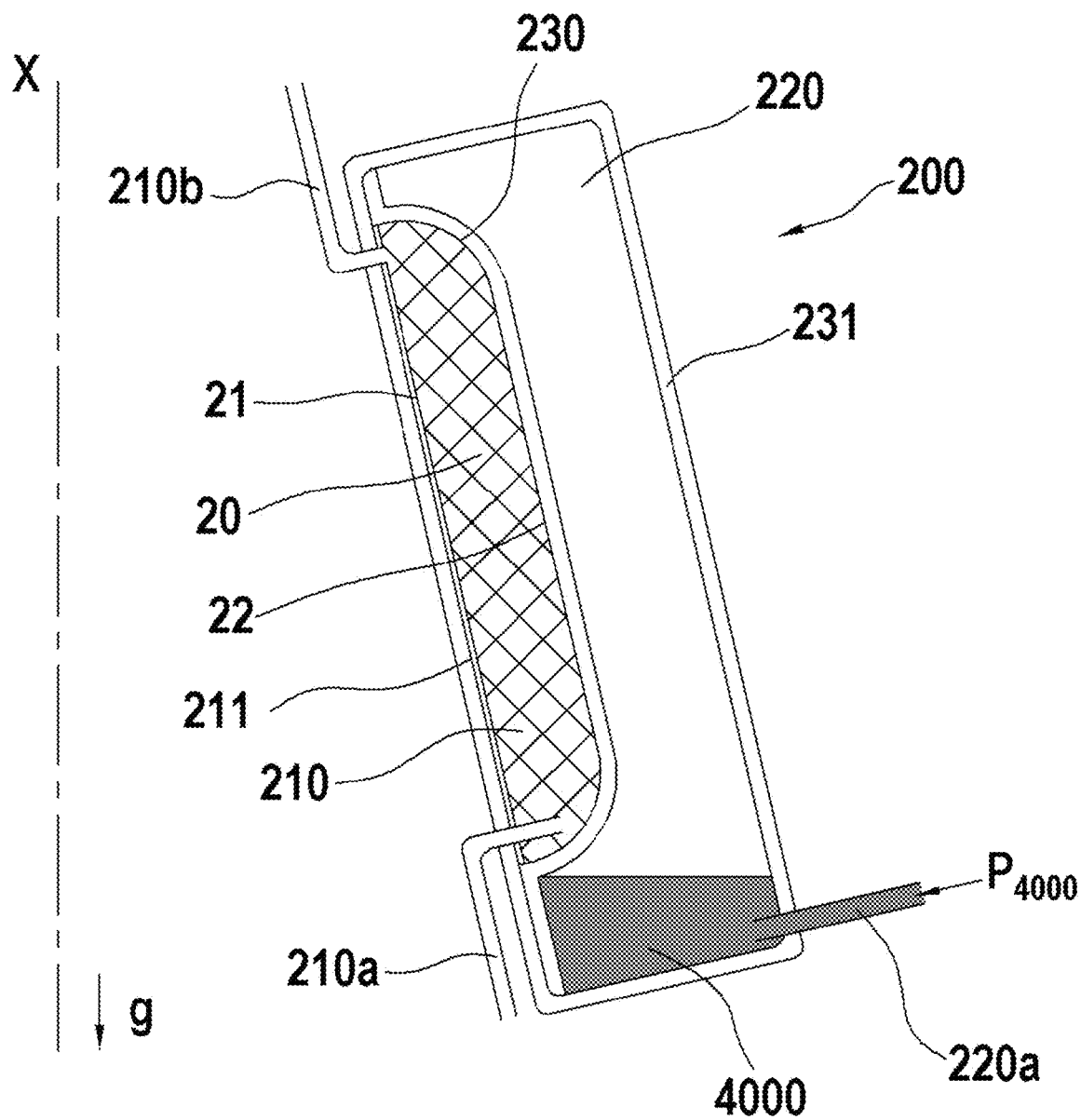

[Fig. 7]
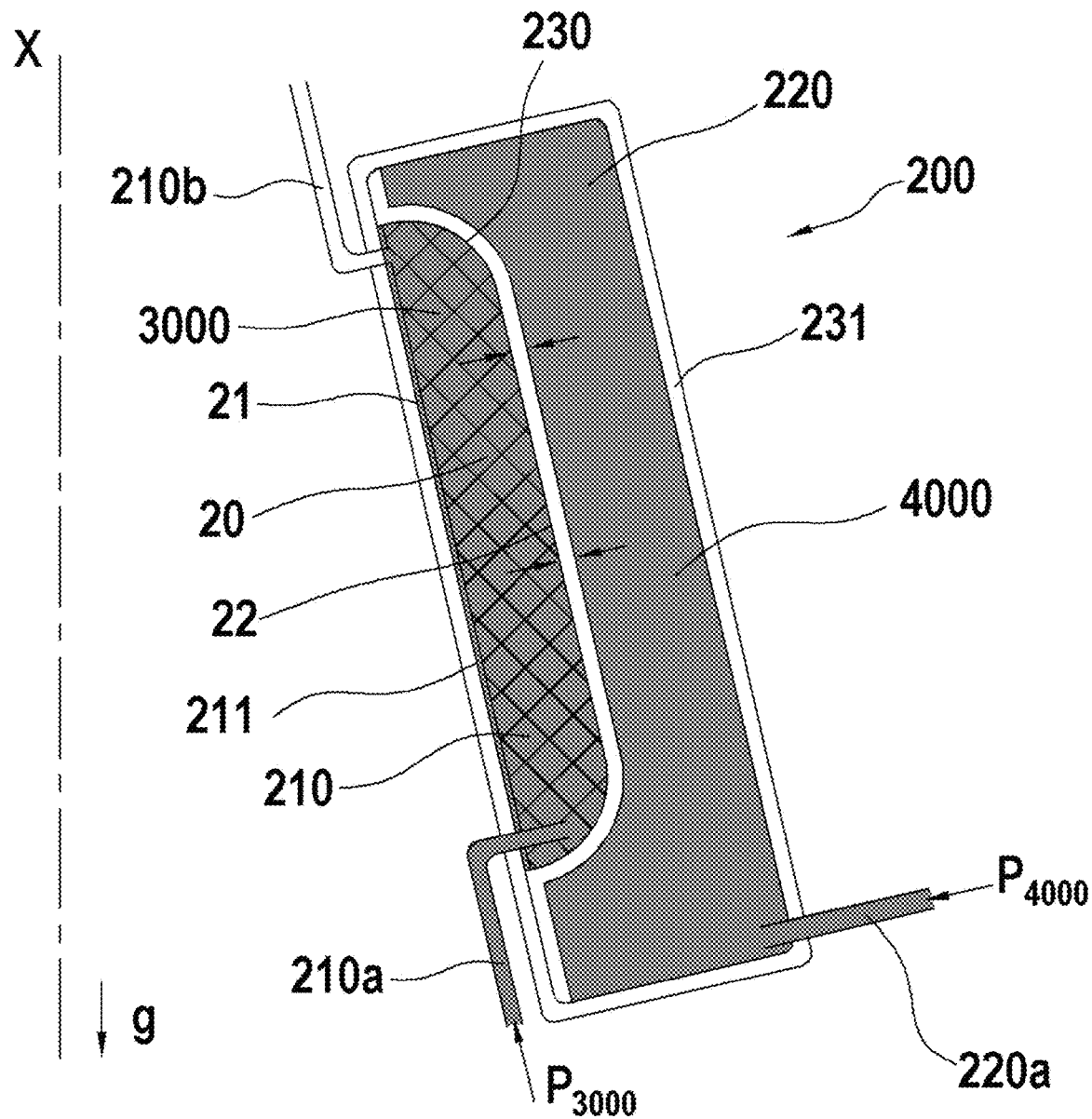

[Fig. 8]
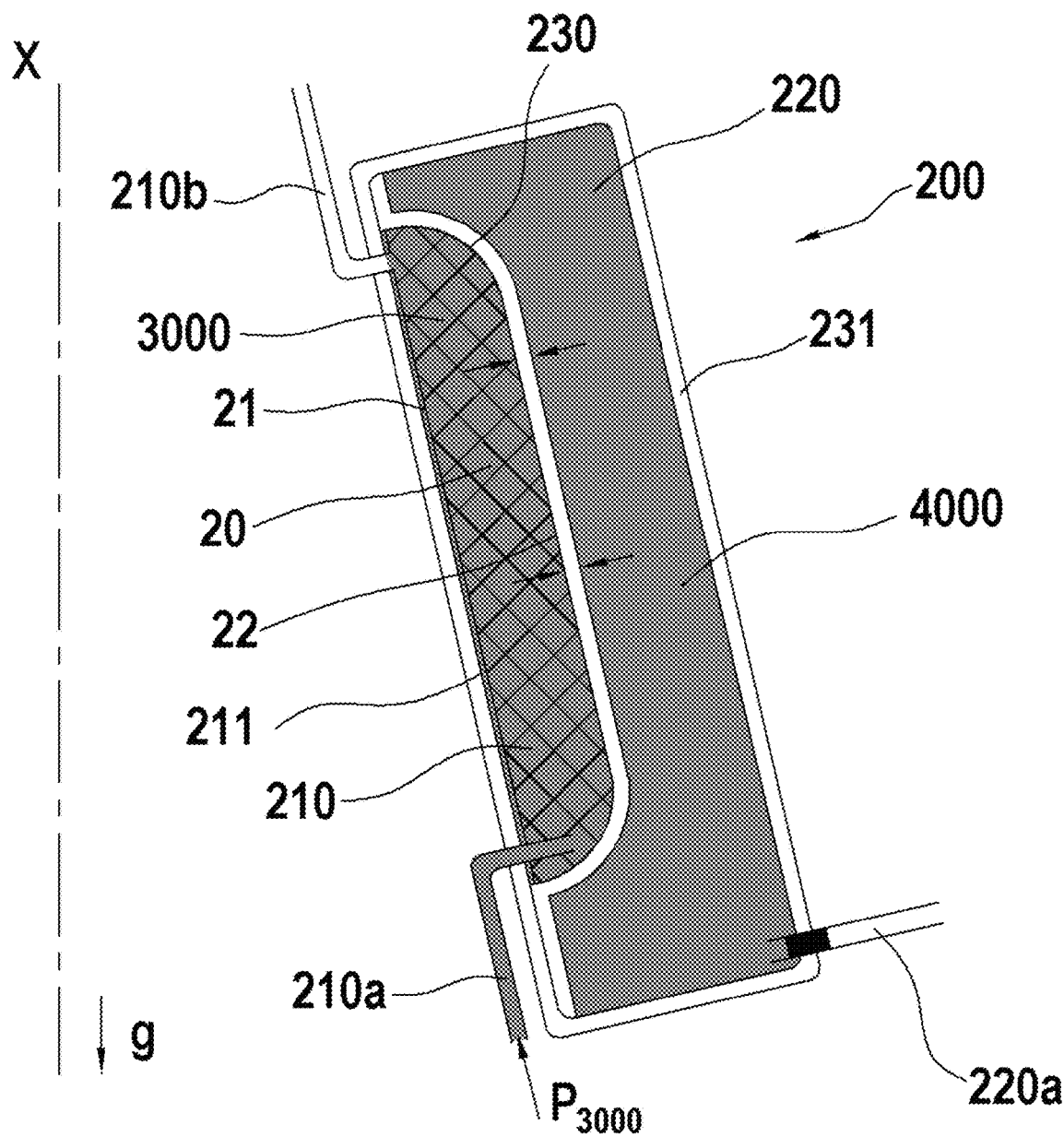

[Fig. 9]
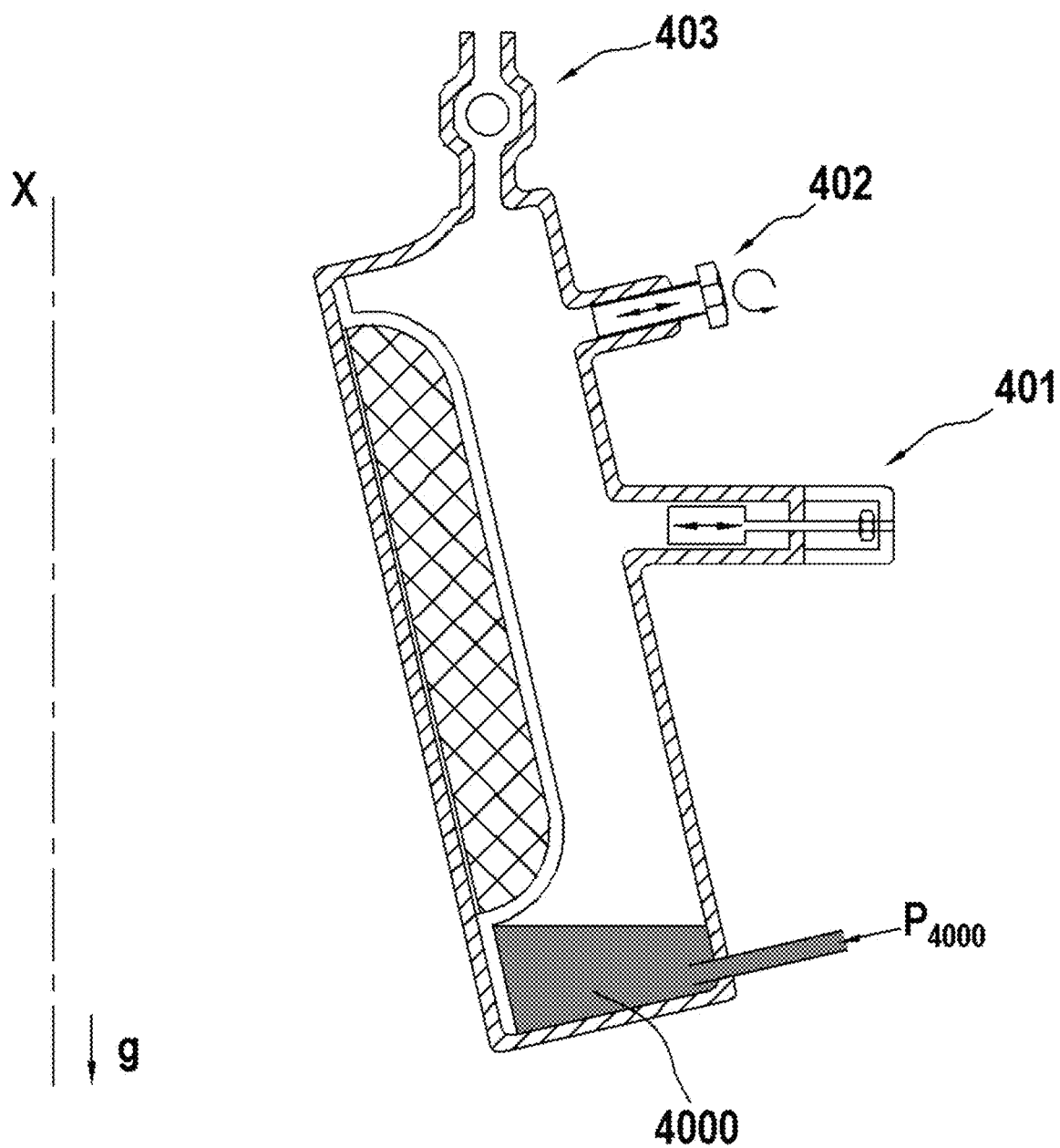

METHOD FOR MANUFACTURING A PART MADE OF COMPOSITE MATERIAL WITH LIQUID COMPACTING

CROSS-REFERENCE TO RELATED APPLICATIONS

This application is the U.S. National Stage of PCT/FR2023/050041, filed Jan. 12, 2023, which in turn claims priority to French patent application number 2200348 filed Jan. 17, 2022. The content of these applications are incorporated herein by reference in their entireties.

TECHNICAL FIELD

The present invention relates to the general field of manufacturing parts made of composite material, in particular with a ceramic (CMC) or organic (CMO) matrix.

PRIOR ART

Parts made of composite material with a ceramic or organic matrix are generally manufactured by impregnation of a fibrous preform. The fibrous preform can be placed in a mold, closed by a counter-mold. The fibrous preform is then impregnated with a slip loaded with particles of a matrix precursor or with a resin, depending on the type of matrix desired. The impregnation is carried out by injecting the slip or the resin into the molding cavity which contains the fibrous preform, so as to gradually penetrate the slip or the resin into the fibrous preform.

The impregnation solutions using a mold and a counter-mold are, however, unsatisfactory for the manufacture of large but thin parts, such as for example aeronautical rear body parts. Indeed, the dimensional tolerances that the mold and the counter-mold must respect are extremely restricted, which greatly complicates the manufacture of a mold and a counter-mold adapted to such parts.

Thus, to manufacture large but thin parts, it is possible to use a deformable membrane instead of the counter-mold. Therefore it is possible to overcome the problems of tool tolerancing. Such a solution is for example described in document US2017334791A1, which describes an injection molding method (RTM). In this document, the slip is injected into the impregnation chamber in which the fibrous preform is disposed, then pressure is exerted on the flexible membrane in order to make the slip penetrate through the fibrous preform. However, this method does not allow satisfactory control of the volume content of fibers.

To overcome this disadvantage, document US2021046671A1 describes a method in which a membrane separates an impregnation chamber, in which the fibrous preform is disposed, from a compaction chamber. In this solution, pressure is first applied to the membrane by injecting a compression fluid into the compaction chamber, before injecting the slip. During the injection of the slip, the injection of the compression fluid is continued so as to maintain the compaction pressure on the fibrous preform.

However, in the case where the part to be infiltrated according to this method is arranged so as to have a surface extended in an inclined or vertical direction, or when the part has dimensions such that it extends over a significant height in the impregnation chamber, undesired variations in the volume ratio of fibers in the height of the manufactured part, or even undesired variations in thickness, may appear. It is then seen that the compaction pressure applied to the preform by the membrane, resulting from the pressure difference between the compression fluid and the impregnation fluid, is not identical over the entire height of the membrane.

Furthermore, existing methods do not allow the application of a very low pressure on the preform, thus requiring permanent and precise control of the pressure difference between the impregnation fluid and the compression fluid. In particular, in the case where the impregnation fluid is a slip, the compaction pressure applied to the fibrous preform is too high and difficult to control, due to the significant variations in pressure in the impregnation chamber.

DISCLOSURE OF THE INVENTION

The present invention therefore aims at overcoming the aforementioned disadvantages by proposing a solution for manufacturing a part made of composite material with fibrous reinforcement.

Thus, the invention proposes a method for manufacturing a part made of composite material comprising the following steps:
arrangement of a fibrous preform in a mold comprising an impregnation chamber being in contact with a first face of the preform on a support surface of the impregnation chamber, the impregnation chamber being closed by a flexible membrane placed facing a second face of the preform opposite the first face, said membrane separating the impregnation chamber from a compaction chamber,
injection of a compression fluid into the compaction chamber and injection of an impregnation fluid comprising a matrix precursor into the impregnation chamber,
solidification treatment of the matrix precursor within the fibrous preform so as to obtain a part made of composite material comprising a fibrous reinforcement bound by a solid matrix,
the method being characterized in that the compression fluid is a liquid in which the value of the density corresponds to between 60% and 125% of the value of the density the impregnation fluid.

Preferably, the compression fluid is a liquid in which the value of the density corresponds to between 90% and 110% of the value of the density the impregnation fluid.

Thus, by using a compression fluid having a density close to that of the impregnation fluid, a substantially constant compaction rate is obtained over the entire height of the membrane. Indeed, the pressure difference between two points of the impregnation liquid located at different altitudes $Z_1$ and $Z_2$ will be substantially identical to the pressure difference between two points of the compression liquid located at the same altitudes $Z_1$ and $Z_2$, because these pressure differences are directly proportional to the density of the fluid. Consequently, the difference in fluid pressure due to altitude will evolve in a substantially identical manner on either side of the membrane, which allows to control very small pressure differences between the compression fluid and the impregnation fluid.

Furthermore, by using a liquid as compression fluid, a quasi-incompressible compression fluid is obtained, which makes it easy to control the differential pressure between the compression fluid and the impregnation fluid, whether during the step of filling the compaction chamber or during infiltration into the preform. Thus, it is also possible to obtain a reduced or even zero pressure difference on either side of the membrane.

The impregnation fluid may be a slip comprising matrix precursor particles or a resin.

According to a particular characteristic of the invention, the fibrous preform disposed in the mold extends over a height greater than or equal to 300 mm in the direction of the acceleration of gravity.

According to another particular characteristic of the invention, the difference between the pressure exerted by the impregnation fluid on the membrane and the pressure exerted by the compression fluid on the membrane is less than 0.5 bar.

Preferably, the difference between the pressure exerted by the impregnation fluid on the membrane and the pressure exerted by the compression fluid on the membrane is less than 0.3 bar.

Preferably, the difference between the pressure exerted by the impregnation fluid on the membrane and the pressure exerted by the compression fluid on the membrane is less than 0.1 bar.

According to another particular characteristic of the invention, the injection of the compression fluid is carried out at least in part during the filling of the impregnation chamber with the impregnation fluid. In particular, the injection of the compression fluid is carried out at least in part during the filling of the impregnation chamber with the impregnation fluid so that the difference in filling height between the compression fluid and the impregnation fluid measured at the membrane according to the direction of the acceleration of gravity is positive or zero, and less than 500 mm, and preferably less than 300 mm, and so that the pressure difference between the compression fluid and the impregnation fluid on either side of the membrane is less than 0.3 bar, and preferably less than 0.1 bar.

A "difference in filling height between the compression fluid and the impregnation fluid measured at the membrane according to the direction of the acceleration of gravity" positive or zero means that the filling height of the compression fluid measured at the membrane is greater than or equal to the filling height of the impregnation fluid measured at the membrane according to the direction of the acceleration of gravity.

Thus, by filling the impregnation chamber and the compaction chamber at the same speed, the application and maintenance of a low differential pressure on the membrane is facilitated.

According to another particular characteristic of the invention, the pressure exerted on the membrane by the compression fluid is increased after filling the impregnation chamber.

Thus, it is easier to apply a low compaction pressure on the fibrous preform, or to hold the membrane in place if the pressure exerted by the impregnation fluid on the membrane increases. Consequently, according to another particular characteristic of the invention, the increase in the pressure exerted on the membrane by the compression fluid after filling the impregnation chamber is achieved while the pressure exerted by the impregnation fluid on the membrane increases.

According to another particular characteristic of the invention, the increase in the pressure exerted on the membrane by the compression fluid is achieved by increasing the filling height of the compression fluid. In particular, the increase in the pressure exerted on the membrane by the compression fluid is achieved by increasing the filling height of the compression fluid so that the difference in filling height between the compression fluid and the impregnation fluid depending on the direction of the acceleration of gravity is greater than 50 mm.

According to another particular characteristic of the invention, the impregnation fluid and the compression fluid have the same composition.

According to another particular characteristic of the invention, the impregnation fluid is a suspension comprising a plurality of matrix precursor particles, the support surface of the impregnation chamber of the mold comprising a filter configured to retain the particles of the suspension in the impregnation chamber.

According to another particular characteristic of the invention, at least a portion of the compression fluid introduced into the compaction chamber is then introduced into the impregnation chamber by a series network.

At least a portion of the compression fluid can then be used as impregnation fluid, provided that said portion of the compression fluid comprises one or more matrix precursors. This circulation of the compression fluid in the compaction chamber then in the impregnation chamber can be achieved by a series network.

According to another particular characteristic of the invention, a permanent pressure control device is present in said series network connecting the compaction chamber to the impregnation chamber.

Thus, according to a particular characteristic of the invention, the introduction of a portion of the compression fluid into the impregnation chamber is carried out by a series network connecting the compaction chamber and the impregnation chamber, said network comprising a permanent pressure control device.

This particular mode allows to dissociate the management of the pressure differential between the compaction chamber and the impregnation chamber from the control of the circulation of the fluid(s) and their static pressure. The permanent pressure control device may be a permanent pressure reducing device.

According to another particular characteristic of the invention, the compression fluid has an isothermal compressibility of less than $10^{-9}$ $Pa^{-1}$ and the walls of the compaction chamber are non-deformable with the exception of the membrane, the increase in pressure exerted on the membrane by the compression fluid being carried out by closing the compaction chamber so that it is filled by the compression fluid.

Thus, the quasi-incompressible compression fluid applies to the membrane a pressure greater than that applied by the impregnation fluid, even when the pressure of the impregnation fluid is increased. Water is an example of a compression fluid with an isothermal compressibility of less than $10^{-9}$ $Pa^{-1}$. Furthermore, some oils whose isothermal compressibility is less than $10^{-9}$ $Pa^{-1}$ can also be used as compression fluid.

According to another particular characteristic of the invention, the compression fluid has an isothermal compressibility of less than $10^{-9}$ $Pa^{-1}$ and the walls of the compaction chamber are non-deformable with the exception of the membrane, and the impregnation fluid is injected into the impregnation chamber once the compaction chamber is filled with the compression fluid and closed.

According to another particular characteristic of the invention, the mold comprises a device for adjusting the volume of the compaction chamber including at least one moving element.

This moving element can be a piston or a screw. Such a volume adjustment device can be configured to compensate for a variation in the volume of the compaction chamber caused by the deformation of the walls of said compaction chamber and by the deformation of the flexible membrane under the effect of pressure during the method, so as to maintain a constant volume of the compaction chamber during the method.

BRIEF DESCRIPTION OF THE DRAWINGS

FIG. 1 is a sectional view of a section of a first manufacturing mold when the compression liquid begins to be injected.

FIG. 2 is a sectional view of a section of the mold of FIG. 1 when the compression liquid and the impregnation fluid are injected simultaneously.

FIG. 3 is a sectional view of a section of the mold of FIGS. 1 and 2 when the impregnation fluid fills the impregnation chamber.

FIG. 4 is a sectional view of a section of the mold of FIGS. 1, 2 and 3 when the filling level of the compaction chamber is greater than the filling level of the impregnation chamber.

FIG. 5 is a sectional view of a section of a manufacturing mold for the injection of a slip.

FIG. 6 is a sectional view of a section of a second manufacturing mold when the compression liquid starts to be injected.

FIG. 7 is a sectional view of a section of the mold of FIG. 6 when the impregnation and compaction chambers are filled.

FIG. 8 is a sectional view of a section of the mold of FIGS. 6 and 7 when the compaction chamber is filled and closed.

FIG. 9 is a sectional view of a section of the mold comprising a device for adjusting the volume of the impregnation chamber.

DESCRIPTION OF EMBODIMENTS

As shown in FIGS. 1 to 4, a system for manufacturing a part made of composite material according to a first embodiment comprises a mold 100 which comprises on the one hand an impregnation chamber 110 in which a fibrous preform 10 is placed and in which an impregnation fluid 1000 is injected, and on the other hand a compaction chamber 120 in which a compression liquid 2000 is injected.

The impregnation chamber 110 and the compaction chamber 120 of the mold 100 are separated by a flexible membrane 130. The membrane 130 allows to apply a compaction pressure on the fibrous preform 10 placed in the impregnation chamber 110, the compaction pressure preferably remaining quite low. This compaction pressure is produced by the compression liquid 2000 which, by applying pressure on the membrane 130, deforms the membrane 130 against the fibrous preform 10 and holds it in place when the pressure increases in the impregnation chamber 110.

The membrane 130 is for example made of silicone. The membrane 230 must be made of a material resistant to the temperatures to which said membrane 230 may be subjected during the method, as well as to the fluids with which the membrane 230 will be in contact. The membrane 230 must have a compressibility consistent with the dimensional tolerance sought for the part. For example, the membrane 230 may have an average thickness of approximately 5 mm and may be made of a rubber type material, having a Young's modulus of approximately 2000 MPa. Such a membrane 230 will become thinner by approximately 1.5 μm under a pressure of 6 bars, guaranteeing very good dimensional tolerance.

The invention applies particularly well to parts having a small thickness and a great height, for example turbomachine casings such as fan casings, compressor casings and exhaust casings or rear bodies. Typically, the invention is particularly interesting for frustoconical parts with a thickness ranging from 1 mm to 6 mm, a diameter of approximately 1 m and a height greater than 1 m. Thus, the fibrous preform is intended to form the fibrous reinforcement of a composite material part having a large size in each of the three dimensions. When the fibrous preform is disposed in the impregnation chamber, it extends over a significant distance in height, preferably greater than or equal to 300 mm.

The fibrous preform has, for example, a complex geometry, which is closed or not. The fibrous preform may have a geometry of revolution with a curved or rectilinear generatrix. The fibrous preform may for example have a shape that is at least partially cylindrical or frustoconical.

The fibrous preform is considered here as the fibrous structure of the composite part, obtained by any technique or combination of textile constitution technique, arrangement and deformation to apply it in a tool.

The preform can thus be produced at least in part by stacks of strata or folds obtained by two-dimensional (2D) weaving. The preform can also be made directly in one piece by three-dimensional (3D) weaving. "Two-dimensional weaving" means here a conventional weaving method by which each weft thread passes from one side to the other of threads of a single warp layer or vice versa. "Three-dimensional weaving" means here a weaving by which warp threads pass through several layers of weft threads, or weft threads pass through several layers of warp threads.

The preform can also be produced at least in part by layers of unidirectional fibers (UD), which can be obtained by depositing ribbons or by automatic fiber placement (AFP), or by filament winding.

The preform can be made from fibers consisting of the following materials: alumina, mullite, silica, an aluminosilicate, a borosilicate, silicon carbide, carbon, or a mixture of several of these materials. The fibrous preform can be made from any type of glass fibers.

In the example illustrated in FIGS. 1 to 4, the fibrous preform 10 is a frustoconical part with an axis of revolution X. The fibrous preform 10 thus comprises a first frustoconical inner face 11 and a second outer face 12 also frustoconical.

The impregnation chamber 110 is delimited by the membrane 130 and by at least one surface 111 located facing the membrane 130. When the fibrous preform 10 is placed in the impregnation chamber 110, the first inner face 11 of the preform 10 rests on the surface 111 of the impregnation chamber 110 and the second outer face 12 of the preform 10 is placed facing the membrane 130. Consequently, the surface 111 of the impregnation chamber 110 has a geometry adapted to the first inner face 11 of the preform 10. In the example illustrated in FIGS. 1 to 4, the surface 111 of the impregnation chamber 110 therefore has a frustoconical geometry with an axis of revolution X identical to the axis of revolution X of the fibrous preform 10.

The mold 100 comprises at least one inlet orifice 110a of the impregnation fluid 1000 and may comprise at least one outlet orifice 110b of the impregnation fluid 1000. Preferably, the inlet orifice(s) 110a are located at one end of the surface 111 of the impregnation chamber 110 and the outlet orifice(s) 110b of the impregnation fluid 1000 are located at the other end of the surface 111 of the impregnation chamber 110. Preferably, the inlet orifices 110a and the outlet orifices 110b are distributed over the length or circumference of the fibrous preform 10.

The manufacturing system further comprises an impregnation fluid injection device 1000 configured to inject said impregnation fluid 1000 into the impregnation chamber 110 at a pressure $p_{1000}$.

The compaction chamber is delimited by the membrane 130 and by at least one wall 131 located facing the membrane 130. Preferably, the wall(s) 131 are not deformable, in particular under the effect of the compression liquid 2000.

The mold 100 comprises at least one inlet orifice 120a of the compression liquid 2000 and may comprise at least one outlet orifice 120b of the compression liquid 2000. Preferably, the inlet orifice(s) 120a are located at one end of the wall 212 of the compaction chamber 120 and the optional outlet orifice(s) 120b of the compression liquid 2000 are located at the other end of the wall 212 of the compaction chamber 120. Preferably, the inlet orifices 120a and the outlet orifices 120b are distributed over the length or circumference of the compaction chamber 120.

The mold 100 can also comprise gas outlet orifices, for example to allow air to be purged in the compaction chamber 120. These gas outlet orifices can open into the upper part of the compaction chamber 120. These gas outlet orifices can be merged at least in part with the outlet orifices 120b of the compression liquid 2000.

The manufacturing system further comprises a compression liquid injection device 2000 configured to inject said compression liquid 2000 into the compaction chamber 120 at a pressure $p_{2000}$.

For the manufacture of a part made of composite material with a ceramic matrix, the impregnation fluid can be a slip, that is to say a liquid in which ceramic particles are dispersed and maintained in suspension.

The liquid phase of the slip can in particular consist of water, ethanol, or any other liquid in which it is possible to suspend the desired powder.

The ceramic particles in the slip may be alumina, mullite, silica, zirconia, aluminosilicate or aluminophosphate, or a mixture of these components. The ceramic particles can also be made of carbide, for example silicon carbide, or be carbon powders, for example graphite or carbon black.

FIG. 5 shows a variant for the manufacture of a part made of composite material with a ceramic matrix by injection of a slip comprising particles. In this variant, the mold 300 comprises a compaction chamber 320 similar to that described previously intended to receive the compression liquid 2000, as well as an impregnation chamber 310 in which rests a fibrous preform 30 similar to that described previously. The impregnation fluid 1000, which here corresponds to the slip, is introduced into the impregnation chamber through at least one inlet orifice 310a. The mold 300 further comprises one or more outlet orifices 310b allowing to evacuate the liquid phase from the slip. The outlet orifices 310b are disposed on a surface 311 of the impregnation chamber 310, preferably located opposite the membrane 330.

A filter 340 is disposed in the impregnation chamber 310 of the mold 300 between a face 31 of the preform 30 and the surface 311 of the impregnation chamber 310 having the outlet orifice(s) 310b. On the one hand, the filter 340 allows the passage of the liquid phase of the slip, which has circulated through the preform 30, so that said liquid phase is evacuated from the impregnation chamber 310 via the outlet orifice(s) 310b. On the other hand, the filter 340 allows to retain the particles present in the slip inside the impregnation chamber 310.

Thus, the size of the porosities of the filter 340 is adapted to the size of the particles of the slip so that said particles of the slip do not pass through said filter 340 and are retained in the impregnation chamber 310.

In the variant illustrated in FIG. 5, the mold 300 further comprises a collection device 350 allowing to collect the liquid phase of the slip, to evacuate it through a channel 350b. Of course one does not depart from the scope of the invention if the mold does not comprise such a collection device.

For the manufacture of a part made of composite material with a ceramic matrix by injection of a slip comprising particles, the value of the density of the compression liquid is between 60% and 125% of the value of the density of the slip. Preferably, the value of the density of the compression liquid is between 90% and 110% of the value of the density of the slip.

For the manufacture of a part made of composite material with an organic matrix, the impregnation fluid can be a thermosetting or thermoplastic resin. The value of the density of the compression liquid is then between 60% and 125% of the value of the density of the resin. Preferably, the value of the density of the compression liquid is between 90% and 110% of the value of the density of the resin.

For the manufacture of a part made of composite material with a metal matrix, the impregnation fluid can be a liquid or semi-solid metal. The metal used as the impregnation fluid may be an aluminum alloy, a titanium alloy or a magnesium alloy. In this configuration, the membrane can be made of thin metal in order to withstand the temperatures of the method while being sufficiently flexible.

Generally speaking, the compression liquid can have a density very close or even identical to that of the impregnation fluid, and thus the compression liquid can have the same composition as the impregnation fluid. In particular, at least a portion of the compression liquid introduced into the compaction chamber can then be introduced into the impregnation chamber as impregnation fluid, for example by a series network. In this configuration, the outlet orifice(s) 120b of the compression liquid 2000 are connected to the inlet orifice(s) 110a of the impregnation liquid 1000, for example by a series network.

A permanent pressure management device may be present in the network connecting the outlet orifice(s) 120b of the compression liquid 2000 to the inlet orifice(s) 110a of the impregnation liquid 1000. It is thus possible to dissociate the management of the pressure differential between the fluids in the compaction chamber and the impregnation chamber for controlling the circulation of the fluid(s) and their static pressure.

The method for manufacturing the composite material part according to the first embodiment of the invention comprises a step of filling the impregnation chamber 110 illustrated in FIGS. 1 to 3. During this step, the impregnation fluid 1000 is injected into the impregnation chamber 110 through the inlet orifice(s) 110a at an injection pressure $p_{1000}$ and the compression liquid 2000 in the compaction chamber 120 through the inlet orifice(s) 120a at an injection pressure $p_{2000}$.

Preferably, during this step of filling the impregnation chamber 110 and when the densities of the impregnation fluid 1000 and the compression liquid 2000 are almost identical, the injection of the compression liquid 2000 is carried out so that the difference in filling height directed in the direction of gravity g between the compression liquid 2000 and the impregnation fluid 1000 measured at the membrane 130 is less than 500 mm, preferably less than 300 mm and more preferably less than 50 mm. Preferably, the filling height of the compression liquid 2000 measured at the membrane is greater than or equal to the filling height of the impregnation fluid 1000 throughout the filling step. Thus, the impregnation chamber 110 and the compaction chamber 120 are filled simultaneously and at the same speed, so that the filling height of the impregnation fluid 1000 measured at the membrane 130 is substantially identical to the height of filling of the compression liquid 2000 measured at the membrane 130.

Preferably, the injection of the compression liquid 2000 is carried out so that the difference in filling height directed in the direction of gravity g between the compression liquid 2000 and the impregnation fluid 1000 measured at the membrane 130 generates a differential pressure on the membrane less than 0.25 bar, preferably less than 0.15 bar and preferably less than 0.05 bar. Thus, the filling heights of the compression liquid 2000 and the impregnation fluid 1000 can be controlled and modified so as to correct a slight difference in value between the density of the impregnation fluid 1000 and the compression liquid 2000, thus allowing to obtain the desired differential pressure on the membrane.

It is possible to start by filling only the compaction chamber 120, with the compression liquid 2000, until reaching the height of the membrane 130, as illustrated in FIG. 1. Then, the impregnation fluid 1000 starts to be injected into the impregnation chamber 110 while continuing the injection of the compression liquid 2000, maintaining a filling height difference between the compression liquid 2000 and the impregnation fluid 1000 so that the hydrostatic pressure applied by the impregnation fluid 1000 on the membrane 130 is slightly lower than the hydrostatic pressure applied by the compression liquid 2000 on the membrane 130.

Thus, as illustrated in FIG. 2, a difference in filling height h between the compression liquid 2000 and the impregnation fluid 1000 measured at the membrane 130 according to the direction of the acceleration of gravity g is maintained. In this case, the pressure applied to the fibrous preform will be less than or equal to $p_{2000}gh$. Indeed, the pressure $p_{s1000}$ at the surface of the impregnation fluid 1000 and the pressure $p_{s2000}$ at the surface of the compression liquid 2000 are zero, while the pressure $P_{p2000}$ of the compression liquid 2000 at the height of the surface of the impregnation fluid 1000 will correspond to $p_{2000}gh$. For example, in the case of a difference in filling height h=50 mm and for a liquid having a density of $p_{2000}$=1000 kg·m$^3$, a pressure is applied to the fibrous preform 10 approximately less than or equal to at 0.05 bars.

By using a compression liquid 2000 of density $p_{2000}$ similar to the density $p_{1000}$ of the impregnation fluid 1000, the compaction pressure applied to the membrane 130 is constant over the entire height of the membrane in the direction Z oriented according to the acceleration of gravity g. Indeed, the pressure difference due to the altitude between two points $P_{h1z1}$ and $P_{h1z2}$ of respective altitudes $z_1$ and $z_2$ bathed in the compression fluid 1000 inside the impregnation chamber 110 is $p_{1000}g(z_2-z_1)$. Likewise, the pressure difference due to the altitude between two points $P_{h2z1}$ and $P_{h2z2}$ of respective altitudes $z_1$ and $z_2$ bathing in the compression liquid 2000 inside the compaction chamber 120 is $p_{2000}(z_2-z_1)$. Thus, as the densities $p_{1000}$ and $p_{2000}$ are substantially equal, the pressure variations due to altitude will be substantially identical on either side of the membrane 130.

The impregnation fluid 1000 is injected until the impregnation chamber 110 is completely filled, as illustrated in FIG. 3.

When the impregnation chamber 110 is completely filled with the impregnation fluid 1000, it may be desired to increase the pressure of the compression liquid 2000 on the membrane 130, to improve compaction or maintain a constant compaction pressure.

For example, if the impregnation fluid is a slip comprising particles, it is possible to continue the injection of the impregnation fluid 1000 into the impregnation chamber 110 even when the latter is filled to ensure good impregnation of the fibrous preform 10. Thus, the pressure in the impregnation chamber increases, and the pressure exerted by the impregnation fluid 1000 on the membrane 130 increases. In order to maintain a constant compaction pressure, it is therefore necessary to increase the pressure of the compression liquid 2000 on the membrane 130.

In this first embodiment of the invention illustrated in FIGS. 1 to 4, the pressure exerted by the compression liquid 2000 on the membrane 130 is increased by increasing the filling height of the compression liquid 2000, as illustrated in FIG. 4. This first embodiment is particularly interesting in the case where it is desired to apply slight compaction to the fibrous preform by pressure of the membrane, for example when the volume ratio of fibers in the fibrous preform is not satisfactory. Thus, it is for example possible to increase the volume ratio of fibers in the fibrous preform before injection. The compaction pressure applied by the membrane, that is to say the difference between the pressure exerted by the impregnation fluid on the membrane and the pressure exerted by the compression fluid on the membrane, is less than 0.5 bar. Preferably, this pressure difference is less than 0.3 bar, or even less than 0.1 bar.

According to a second embodiment of the invention, the pressure exerted by the compression liquid on the membrane is increased by a pressure regulating device, or by a differential pressure maintaining device. For example, use can be made of a regulation automaton with servo-control of one pressure relative to the other. It is also possible to modify the height of the reservoirs of the impregnation fluid and the compression fluid in order to vary the pressure exerted on the membrane.

FIGS. 6 to 8 describe a third embodiment of the invention, in which the pressure exerted by the membrane is controlled by completely filling the compression chamber and closing it. FIGS. 6 to 8 illustrate a system for manufacturing a part made of composite material comprising a mold 200 which comprises on the one hand an impregnation chamber 210 in which a fibrous preform 20 is placed, and on the other hand a compaction chamber 220 into which a compression liquid 4000 is injected. In this third embodiment of the invention, the compression liquid is preferably very weakly compressible. Thus, it preferably has an isothermal compressibility of less than $10^{-9}$ Pa$^{-1}$.

In this third embodiment of the invention, if the compression liquid is not very weakly compressible, the loss of volume due to compression can be compensated by gradually reducing the volume of the compaction chamber, for example through a device for adjusting the volume of the compaction chamber. This adjustment device allows to reduce the volume of the compaction chamber by means of a piston or a screw. FIG. 9 illustrates an example of device 401 for adjusting the volume of the compaction chamber by means of a piston and an example of device 402 for adjusting the volume of the compaction chamber by means of a screw. Of course one does not depart from the scope of the invention if the mold has a single device for adjusting the volume of the compaction chamber or more than two devices for adjusting the volume of the compaction chamber. Furthermore, FIG. 9 illustrates an example of orifice 403 allowing gas purge.

The impregnation chamber 210 and the compaction chamber 220 of the mold 200 are separated by a flexible membrane 230. The membrane 230 allows to apply a compaction pressure on the fibrous preform 20 placed in the impregnation chamber 210, the pressure compaction preferably remaining quite low. This compaction pressure is produced by the compression liquid 4000 which, by applying pressure on the membrane 230, deforms the membrane 230 against the fibrous preform 20 and holds it in place when the pressure increases in the impregnation chamber 210. The membrane 230 can have the same characteristics as the membrane 130 described previously.

The fibrous preform 20 can have the same characteristics as those described in the first embodiment of the invention, and can be produced according to any of the means described in this first embodiment. In the example illustrated in FIGS. 6 to 8, the fibrous preform 20 is an open or closed part around the axis X, which comprises a first inner face 21 and a second outer face 22.

The impregnation chamber 210 is delimited by the membrane 230 and by at least one surface 211 located facing the membrane 230. When the fibrous preform 20 is disposed in the impregnation chamber 210, the first inner face 21 of the preform 20 rests on the surface 211 of the impregnation chamber 210 and the second outer face 22 of the preform 20 is placed facing the membrane 230. Consequently, the surface 211 of the impregnation chamber 210 has a geometry adapted to the first inner face 21 of the preform 20.

The mold 200 comprises at least one inlet orifice 210a of the impregnation fluid 3000 and at least one outlet orifice 210b of the impregnation fluid 3000. Preferably, the inlet orifice(s) 210a are located at one end of the surface 211 of the impregnation chamber 210 and the outlet orifice(s) 210b of the impregnation fluid 3000 are located at the other end of the surface 211 of the impregnation chamber 210. Preferably, the inlet orifices 210a and the outlet orifices 210b are distributed over the length or circumference of the fibrous preform 20.

The manufacturing system further comprises an impregnation fluid injection device 3000 configured to inject said impregnation fluid 3000 into the impregnation chamber 210 at a pressure $p_{3000}$.

The compaction chamber 220 is delimited by the membrane 230 and by at least one wall 231 located facing the membrane 230. In this third embodiment of the invention, the wall(s) 231 are not deformable, in particular under the effect of the compression liquid 4000.

The mold 200 comprises at least one inlet orifice 220a for the compression liquid 4000. This inlet orifice 220a for the compression liquid 4000 can be hermetically sealed. The mold 200 may comprise at least one outlet orifice for the compression liquid 4000.

The mold 200 comprises, as in the previous embodiment, one or more orifices (not shown) for the evacuation of gases during the filling of the compaction chamber 220 with the compression liquid 4000, preferably located at the top of said compaction chamber 220 and positioned according to the geometry of the mold 200.

The manufacturing system further comprises a compression liquid injection device 4000 configured to inject said compression liquid 4000 into the compaction chamber 220 at a pressure $p_{4000}$.

In this third embodiment, the characteristics of the impregnation fluid 3000 can be those described in the context of the first embodiment of the invention. In the case of a slip comprising particles, a filter (not shown) can be placed in the impregnation chamber at the location where the outlet orifice(s) of the impregnation fluid open. This filter can be interposed between the first inner face 21 of the preform 20 and the surface 211 of the impregnation chamber 210 in the example illustrated in FIGS. 6 to 8. The filter can for example have the same characteristics as those described in the context of FIG. 5.

The method for manufacturing the composite material part according to this third embodiment of the invention comprises a step of filling the compaction chamber 220 illustrated in FIG. 6. During this step, the compression fluid 4000 is injected into the compaction chamber 220 through the inlet orifice(s) 220a at an injection pressure $p_{4000}$.

The impregnation fluid 3000 is injected until the impregnation chamber 210 is completely filled, as illustrated in FIG. 7.

When the compaction chamber 220 is completely filled, the inlet orifice(s) 220a of the compression fluid 4000 is (are) closed by adjusting the pressure of the compression fluid 4000 inside the compaction chamber 220, as illustrated in FIG. 8.

According to a first embodiment of this third mode illustrated in FIGS. 6 to 8, the injection of the impregnation fluid 3000 into the impregnation chamber 210 is carried out during the step of filling the compaction chamber 220. Preferably, in this example, the injection of the impregnation fluid 3000 is carried out so that the difference in filling height directed in the direction of gravity g between the compression liquid 4000 and the impregnation fluid 3000 measured at the membrane 230 generates a differential pressure on the membrane less than 0.5 bar, preferably less than 0.3 bar and preferably less than 0.1 bar.

It is possible to start by filling only the compaction chamber 220, with the compression liquid 4000, until reaching the height of the membrane 230, as illustrated in FIG. 6. Then, the impregnation fluid 3000 starts to be injected into the impregnation chamber 210 while continuing the injection of the compression liquid 4000, so that the hydrostatic pressure applied by the impregnation fluid 3000 on the membrane 230 is slightly lower than the hydrostatic pressure applied by the compression liquid 4000 on the membrane 230.

In the case where the densities $p_{3000}$ and $p_{4000}$ are almost identical, this corresponds to carrying out the introduction of the impregnation fluid 3000 and the introduction of the compression liquid 4000 so that the levels of the impregnation fluid 3000 and compression liquid 4000 are substantially identical on either side of the membrane 230, as illustrated in FIG. 7.

When the compaction chamber 220 is completely filled with the compression liquid 4000, the inlet orifice(s) 220a of the compression liquid 4000 is (are) closed, as illustrated in FIG. 8.

According to a second embodiment of this third mode, the injection of the impregnation fluid 3000 is only carried out once the compaction chamber 220 has been completely filled with the compression liquid 4000 and the inlet orifices 220a of the compression liquid 4000 have been closed, as illustrated in FIGS. 6 and 8, FIG. 7 excluded.

Thus, in this third embodiment of the invention, when the pressure of the impregnation fluid 3000 in the impregnation chamber 210 increases, the membrane 230 is held in place. Indeed, as the compression liquid 4000 is almost incompressible, due to its liquid nature, and as the walls 231 of the compaction chamber 210 are almost indeformable, the membrane 230 will be held in place despite the increase in pressure of the impregnation fluid 3000 on said membrane 230. The compaction pressure exerted by the membrane on the fibrous preform 20 will therefore be constant despite the increase in pressure in the impregnation chamber 210. Preferably, the compression liquid is a liquid as incompressible as possible, for example water.

This third embodiment is particularly interesting in the case where the volume ratio of fibers in the fibrous preform is already satisfactory and it is not desired to apply additional compaction to the fibrous preform by pressure of the membrane. Thus, the compaction pressure applied by the membrane, that is to say the difference between the pressure exerted by the impregnation fluid on the membrane and the pressure exerted by the compression fluid on the membrane, is less than 0.5 bar. Preferably, this pressure difference is less than 0.3 bar, or even less than 0.1 bar.

Additional compaction can, however, be achieved by increasing the filling height of the compression liquid, for example by using a compaction chamber significantly higher than the impregnation chamber, or by using a pressure regulating device.

In each of the embodiments described above, the fibrous preform impregnated with the impregnation fluid is then treated in a well-known manner so as to solidify the matrix precursor in the porosity of the fibrous preform, in order to obtain a part having the shape of the composite material part to be manufactured. The treatment mode must be adapted in a well-known manner to the type of impregnation fluid used.

The invention claimed is:

1. A method for manufacturing a part made of composite material comprising:
    arrangement of a fibrous preform in a mold comprising an impregnation chamber being in contact with a first face of the preform on a support surface of the impregnation chamber, the impregnation chamber being closed by a flexible membrane placed facing a second face of the preform opposite the first face, said membrane separating the impregnation chamber from a compaction chamber,
    injection of a compression fluid into the compaction chamber and injection of an impregnation fluid comprising a matrix precursor into the impregnation chamber,
    solidification treatment of the matrix precursor within the fibrous preform so as to obtain a part made of composite material comprising a fibrous reinforcement bound by a solid matrix, wherein the compression fluid is a liquid in which a value of a density corresponds to between 60% and 125% of a value of a density the impregnation fluid and
    wherein the compression fluid and the impregnation fluid have the same composition.

2. A method for manufacturing a part made of composite material comprising:
    arrangement of a fibrous preform in a mold comprising an impregnation chamber being in contact with a first face of the preform on a support surface of the impregnation chamber, the impregnation chamber being closed by a flexible membrane placed facing a second face of the preform opposite the first face, said membrane separating the impregnation chamber from a compaction chamber,
    injection of a compression fluid into the compaction chamber and a filling comprising injection of an impregnation fluid comprising a matrix precursor into the impregnation chamber,
    solidification treatment of the matrix precursor within the fibrous preform so as to obtain a part made of composite material comprising a fibrous reinforcement bound by a solid matrix, wherein the compression fluid is a liquid in which the value of the density corresponds to between 60% and 125% of the value of the density the impregnation fluid,
    wherein the injection of the compression fluid is carried out at least in part during the filling of the impregnation chamber with the impregnation fluid so that a difference in filling height between the compression fluid and the impregnation fluid measured at the membrane according to a direction of gravity is positive or zero, and less than 500 mm, the filling height of the compression fluid measured at the membrane being greater than or equal to the filling height of the impregnation fluid measured at the membrane according to the direction of gravity and so that a pressure difference between the compression fluid and the impregnation fluid on either side of the membrane is less than 0.3 bar.

3. The manufacturing method according to claim 2, wherein the fibrous preform disposed in the mold extends over a height greater than or equal to 300 mm in the direction of gravity.

4. The manufacturing method according to claim 2, wherein a difference between a pressure exerted by the impregnation fluid on the membrane and a pressure exerted by the compression fluid on the membrane is less than 0.5 bar.

5. The manufacturing method according to claim 2, wherein the impregnation fluid is a suspension comprising a plurality of matrix precursor particles, a support surface of the impregnation chamber of the mold comprising a filter configured to retain the particles of the suspension in the impregnation chamber.

6. The manufacturing method according to claim 2, wherein at least a portion of the compression fluid introduced into the compaction chamber is then introduced into the impregnation chamber.

7. The manufacturing method according to claim 6, wherein the introduction of said portion of the compression fluid into the impregnation chamber is carried out by a series network connecting the compaction chamber and the impregnation chamber, said network comprising a permanent pressure control device.

8. The manufacturing method according to claim 2, wherein a pressure exerted on the membrane by the compression fluid is increased after filling the impregnation chamber.

9. The manufacturing method according to claim 2, wherein the increase in the pressure exerted on the membrane by the compression fluid is achieved by increasing the filling height of the compression fluid.

10. The manufacturing method according to claim 8, wherein the compression fluid has an isothermal compressibility of less than $10^{-9}$ $Pa^{-1}$ and walls of the walls of the compaction chamber are non-deformable with the exception of the membrane, the increase in a pressure exerted on the membrane by the compression fluid being carried out by closing the compaction chamber so that the compaction chamber is filled by the compression fluid.

11. The manufacturing method according to claim 8, wherein the mold comprises a device for adjusting the volume of the compaction chamber including at least one moving element.

* * * * *